No. 692,527. Patented Feb. 4, 1902.
F. W. KINNEY & R. B. PRICE.
APPARATUS FOR BRINGING THE ENDS OF RUBBER TIRES TOGETHER.
(Application filed Aug. 10, 1900.)
(No Model.) 2 Sheets—Sheet 1.
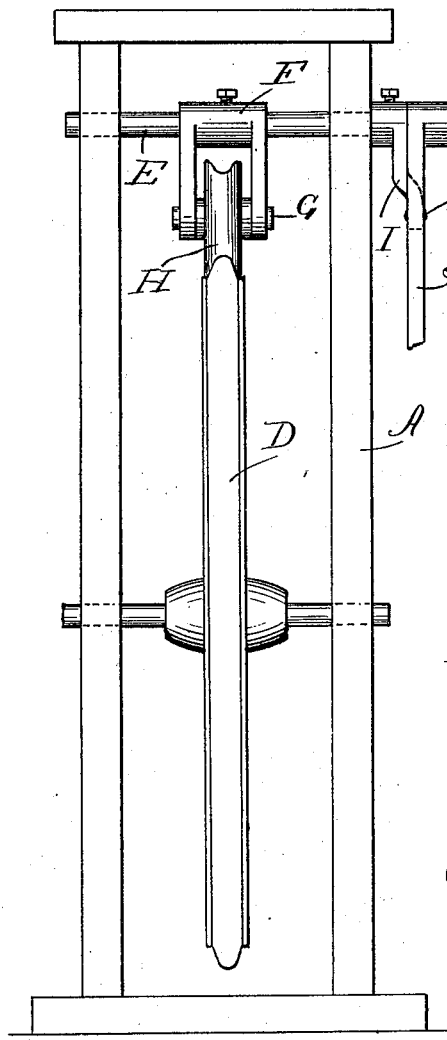
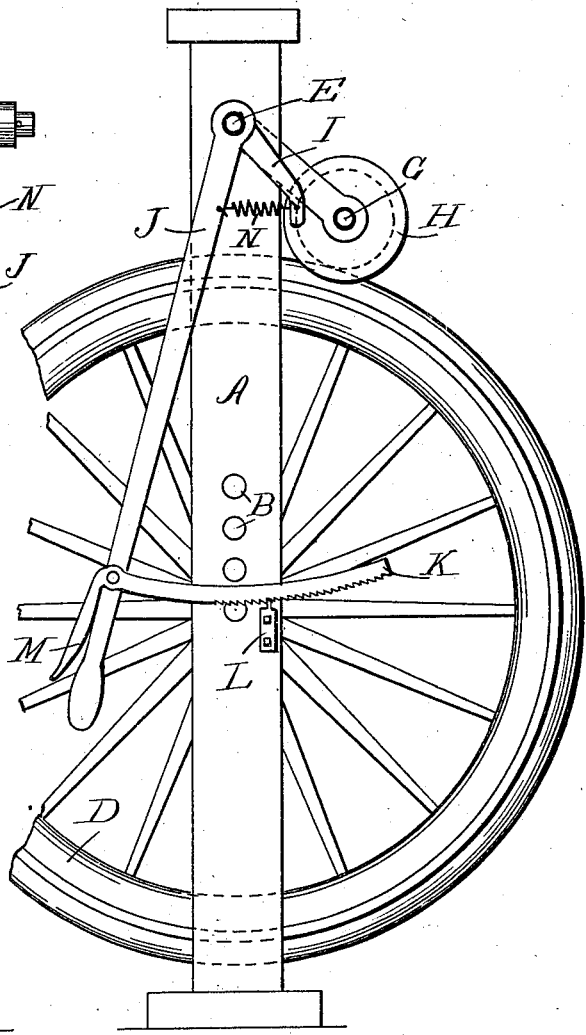

No. 692,527. Patented Feb. 4, 1902.
F. W. KINNEY & R. B. PRICE.
APPARATUS FOR BRINGING THE ENDS OF RUBBER TIRES TOGETHER.
(Application filed Aug. 10, 1900.)
(No Model.) 2 Sheets—Sheet 2.
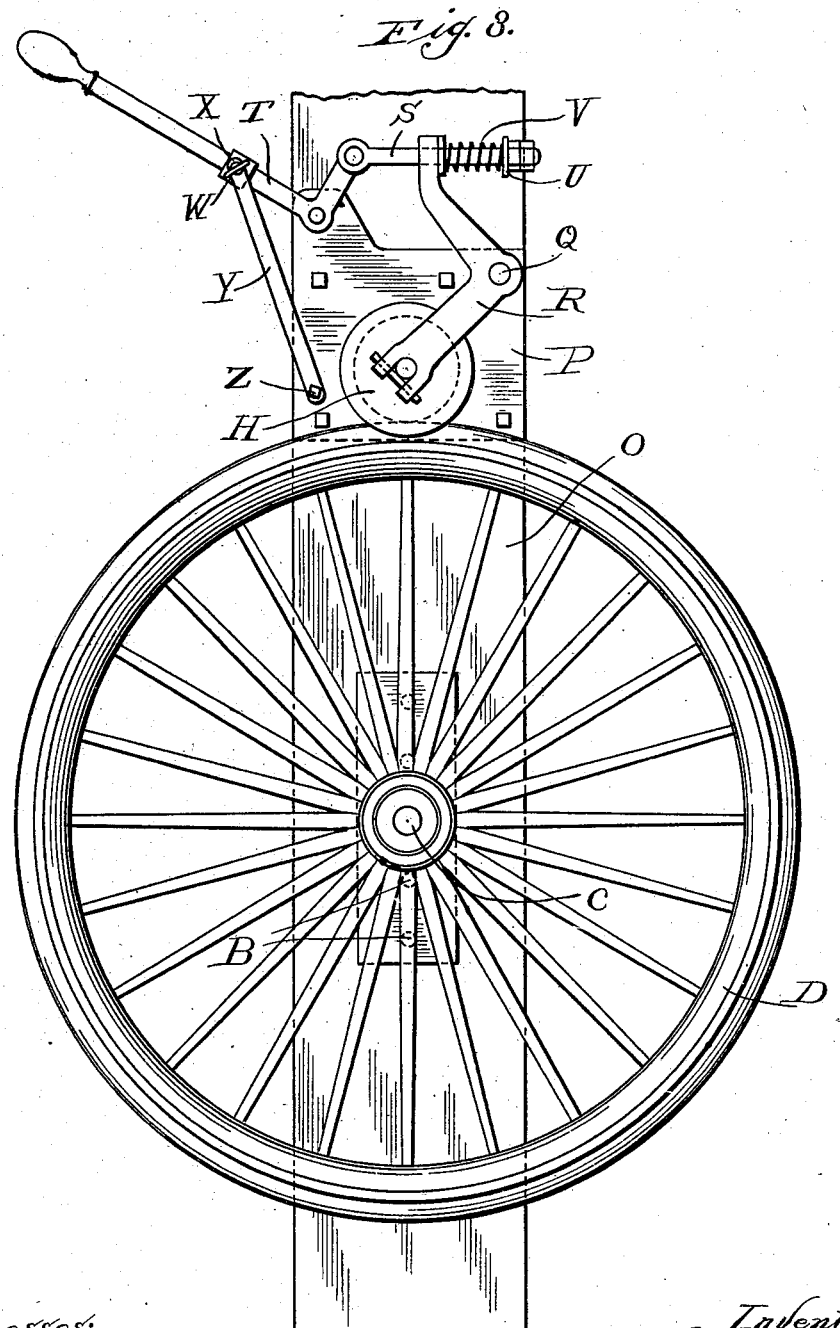

UNITED STATES PATENT OFFICE.

FRANK W. KINNEY AND RAYMOND B. PRICE, OF CHICAGO, ILLINOIS, ASSIGNORS TO CALUMET TIRE RUBBER COMPANY, OF CHICAGO, ILLINOIS, A CORPORATION OF ILLINOIS.

APPARATUS FOR BRINGING THE ENDS OF RUBBER TIRES TOGETHER.

SPECIFICATION forming part of Letters Patent No. 692,527, dated February 4, 1902.

Application filed August 10, 1900. Serial No. 26,477. (No model.)

*To all whom it may concern:*

Be it known that we, FRANK W. KINNEY and RAYMOND B. PRICE, citizens of the United States, residing at Chicago, in the county of Cook and State of Illinois, have invented certain new and useful Improvements in Apparatus for Bringing the Ends of Rubber Tires Together; and we do hereby declare the following to be a full, clear, and exact description of the invention, such as will enable others skilled in the art to which it appertains to make and use the same.

Our invention relates to a novel construction in a device for bringing the ends of solid rubber vehicle-tires together after same have been mounted in the rim, the object being to provide a simple and efficient device of this character; and it consists in the features of construction and combinations of parts hereinafter fully described and claimed.

In the accompanying drawings, illustrating our invention, Figure 1 is a front elevation of a device constructed in accordance with our invention. Fig. 2 is a side elevation of same. Fig. 3 is a front elevation of a modified form of construction.

Our invention, broadly stated, consists in a device upon which the wheel containing the newly-mounted tire is adapted to be revolubly mounted and in providing a roller carried by movable levers which bears upon the tire and is revolved thereby. The roller is brought to bear upon the tire at one point and the wheel is then partially revolved, so that the roller compresses the rubber toward one end of the tire, thereby forcing said end toward the other end of the tire, and thus rapidly bringing said ends together. Very numerous devices for this purpose may be designed, but we have illustrated only two of same, these being deemed sufficient for purposes of illustration.

In said drawings, A indicates a frame comprising two parallel standards connected at their upper and lower ends by means of cross-pieces. Said standards are provided about midway between their ends with perforations or similar devices B to receive a pin or shaft C, upon which a wheel D may be mounted. A shaft E is journaled in bearings in the upper end portion of said frame A and between its ends carries a sleeve F, having two parallel arms, in the ends of which the shaft G of a roller H is journaled. At one end said shaft E carries a crank-arm I, which is partially offset outwardly at its free end. Movably mounted on said shaft E adjacent said crank-arm I is a lever J, which depends therefrom and at its lower end carries a pivoted rack K, adapted to engage a projection L on one of said standards. One end of said rack is bent to form a grip M, which when pressed against said lever J throws said rack out of engagement with said projection L. A tension-spring N is interposed between the end of the crank-arm I and an adjacent point in said lever J, so that by pulling said lever outwardly tension is applied to said crank-arm I, which turns said shaft E and forces said roller H down, so as to bear upon the tire of the wheel. Said roller H is preferably always so mounted as to swing in the plane of the wheel upon which it operates, as this obviates the necessity of accurate adjustment of the pin or shaft C.

In mounting rubber tires on wheels by means of fastening-bands passing longitudinally through the tire the ends of the tire are compressed back from the end portions of the fastening-band, so as to leave the latter free to be secured together. The ends of the band are drawn together by means of tension devices, and after being secured the ends of the tire remain separated and must be brought together. The compression of the rubber may extend either entirely or only partially around the wheel, and by bringing the roller H to bear upon the point where compression begins and turning the wheel the roller forces the ends of the tire toward each other until they are in contact, thus covering the joint in the fastening-band.

In Fig. 3 we have shown another form of our device, in which a single standard O is employed, having perforations to receive the pin C to support the wheel. The said standard carries a face-plate P at its upper end, which is provided with a projecting pin Q, on which a bell-crank lever R is pivoted. The said bell-crank lever R carries the roller H at one end and at its other end is bifurcated to receive the free end of a rod S, pivotally secured at one end to the short arm of a bell-crank lever T, pivoted at its elbow to a pin on said face-plate. Said rod S carries a collar U at its free end, between which and said lever R a compression-spring V is interposed. By drawing the free end of said lever T downwardly said spring V is compressed and forces the roller down upon the tire in an obvious manner. Said lever T may be secured in any desired position by means of a collar W, longitudinally movable thereon and which may be secured against movement by means of the set-screw X. The said collar W is carried by the free end of a link Y, pivotally secured at its other end to a pin Z on said face-plate.

We desire it to be understood that we do not limit ourselves to either of the constructions shown and described, as same may be changed and varied without departing from the spirit of our invention.

We claim as our invention—

1. In a device of the kind specified, the combination with devices for revolubly supporting a wheel, of an arm pivotally mounted on said supporting devices, a roller journaled on said arm and adapted to bear upon the tire of the supported wheel, a lever pivotally mounted on said supporting devices, and a yielding connection between said arm and said lever, whereby when said lever is turned in one direction said roller is brought to bear upon the tire with a yielding pressure.

2. In a device of the kind specified, the combination with devices for revolubly supporting a wheel, of an arm pivotally mounted on said supporting devices, a roller journaled on said arm and adapted to bear upon the tire of the supported wheel, a lever pivotally mounted on said supporting devices, and a spring connection between said arm and said lever, whereby when said lever is turned in one direction said roller is brought to bear upon the tire with a yielding pressure.

3. In a device of the kind specified, the combination with parallel supports and devices for revolubly supporting a wheel between the same, of a lever pivotally mounted between said supports, a roller revolubly mounted on said lever and adapted to bear upon the tire of the wheel, a second lever pivotally mounted on said supporting devices independently of said first-named lever, and a yielding connection between said levers.

4. In a device of the kind specified, the combination with parallel supports and devices for revolubly supporting a wheel between the same, of a lever pivotally mounted between said supports, a roller revolubly mounted on said lever, a spring connected at one end with said lever, and devices engaging said spring at its other end and bearing against a part of said frame for putting tension on said spring, whereby said roller is brought to bear upon the tire of said supported wheel with a yielding pressure.

5. In a device of the kind specified, the combination with devices for revolubly supporting a wheel, of a lever pivotally mounted on said supporting devices, a roller revolubly mounted on said lever and adapted to be brought to bear upon the tire of the supported wheel, and devices for forcing said roller upon the tire of the supported wheel with a yielding pressure, comprising a lever pivotally mounted upon said supporting devices, and a spring connection between said levers.

6. In a device of the kind specified, the combination with devices for revolubly supporting a wheel, of a lever pivotally mounted on said supporting devices, a roller revolubly mounted on said lever and adapted to be brought to bear upon the tire of the supported wheel, a second lever pivotally mounted upon said supporting devices, and a spring interposed between both said levers, whereby by moving said last-named lever said roller will be forced upon the tire of the supported wheel with a yielding pressure.

7. In a device of the kind specified, the combination with devices for revolubly supporting a wheel, of a lever pivotally mounted on said supporting devices and adapted to swing in the plane of the supported wheel, a roller revolubly mounted on said lever and adapted to be brought to bear upon the tire of the supported wheel, a second lever pivotally mounted upon said supporting devices, and a spring connection between said levers.

8. In a device of the kind specified, the combination with devices for revolubly supporting a wheel, of a shaft carried by said supporting devices, an arm on said shaft, a roller revolubly mounted on said arm and adapted to bear upon the tire of the supported wheel, a lever mounted on said shaft and movable with relation to said arm, and a spring connection between said lever and said arm, whereby said roller may be brought to bear upon the tire of the supported wheel with a yielding pressure.

9. In a device of the kind specified, the combination with devices for revolubly supporting a wheel, of an arm pivotally mounted on said supporting devices, a roller revolubly mounted in the free end portion of said arm, a second arm having rigid connection with said first-named arm, a lever pivoted on said supporting devices, and a spring interposed between said lever and said last-named arm.

10. In a device of the kind specified, the combination with devices for revolubly supporting a wheel, of a shaft journaled in said supporting devices, an arm rigidly mounted on said shaft, a roller revolubly mounted in the free end portion of said arm, a second arm rigidly mounted on said shaft, a lever pivotally mounted on said shaft adjacent said last-named arm, and a tension-spring connected at its ends with said last-named arm and said lever respectively.

11. In a device of the kind specified, the combination with devices for revolubly supporting a wheel, and a spring-actuated, revoluble roller movable toward and away from the tire of said wheel, of devices engaging the spring actuating said roller for controlling the pressure of said spring.

12. In a device of the kind specified, the combination with devices for revolubly supporting a wheel, and devices movable toward and away from the tire of said wheel and carrying a revoluble roller adapted to bear upon the tire of said wheel, of a spring engaging said roller-carrying devices, and devices engaging said spring for controlling the pressure of said roller upon said tire.

13. In a device of the kind specified, the combination with a frame, and devices for revolubly supporting a wheel thereon, of a roller adapted to bear upon the tire of the supported wheel, a member carrying said roller movably secured directly to a rigid part of said frame, thereby forming a point of reaction against the pressure exerted upon said tire, a spring engaging said member, and devices carried by said frame and engaging said spring for adjusting the force exerted by the latter on said member carrying said roller.

14. In a device of the kind specified, the combination with a frame for revolubly supporting a wheel, of a member movably mounted directly upon a rigid part of said frame and carrying a roller adapted to bear upon the tire of the supported wheel, said direct connection of said member with said frame forming a point of reaction against the pressure exerted upon said tire, a second member movably mounted on said frame, and a spring interposed between said members for causing said roller to bear upon said tire with a yielding pressure.

15. In a device of the kind specified, the combination with a frame, and devices for revolubly supporting a wheel thereon, of a member movably secured directly to said frame, a roller carried by said member and adapted to bear upon the tire of the supported wheel, and a spring actuating said member, said direct connection between said member and said frame forming a point of reaction against the pressure exerted upon said tire.

16. In a device of the kind specified, the combination with a frame, devices for revolubly supporting a wheel thereon, and a member movably mounted directly on said frame and carrying a roller adapted to bear upon the tire of the supported wheel, said direct connection between said member and said frame forming a point of reaction against the pressure exerted on said tire, of a spring engaging said member for causing said roller to bear upon said tire with a yielding pressure.

In testimony whereof we affix our signatures in presence of two witnesses.

FRANK W. KINNEY.
RAYMOND B. PRICE.

Witnesses:
RUDOLPH WM. LOTZ,
E. F. WILSON.